No. 844,273. PATENTED FEB. 12, 1907.
A. H. FETTERS.
CLUTCH THROWING MECHANISM.
APPLICATION FILED MAY 17, 1905.
2 SHEETS—SHEET 1.
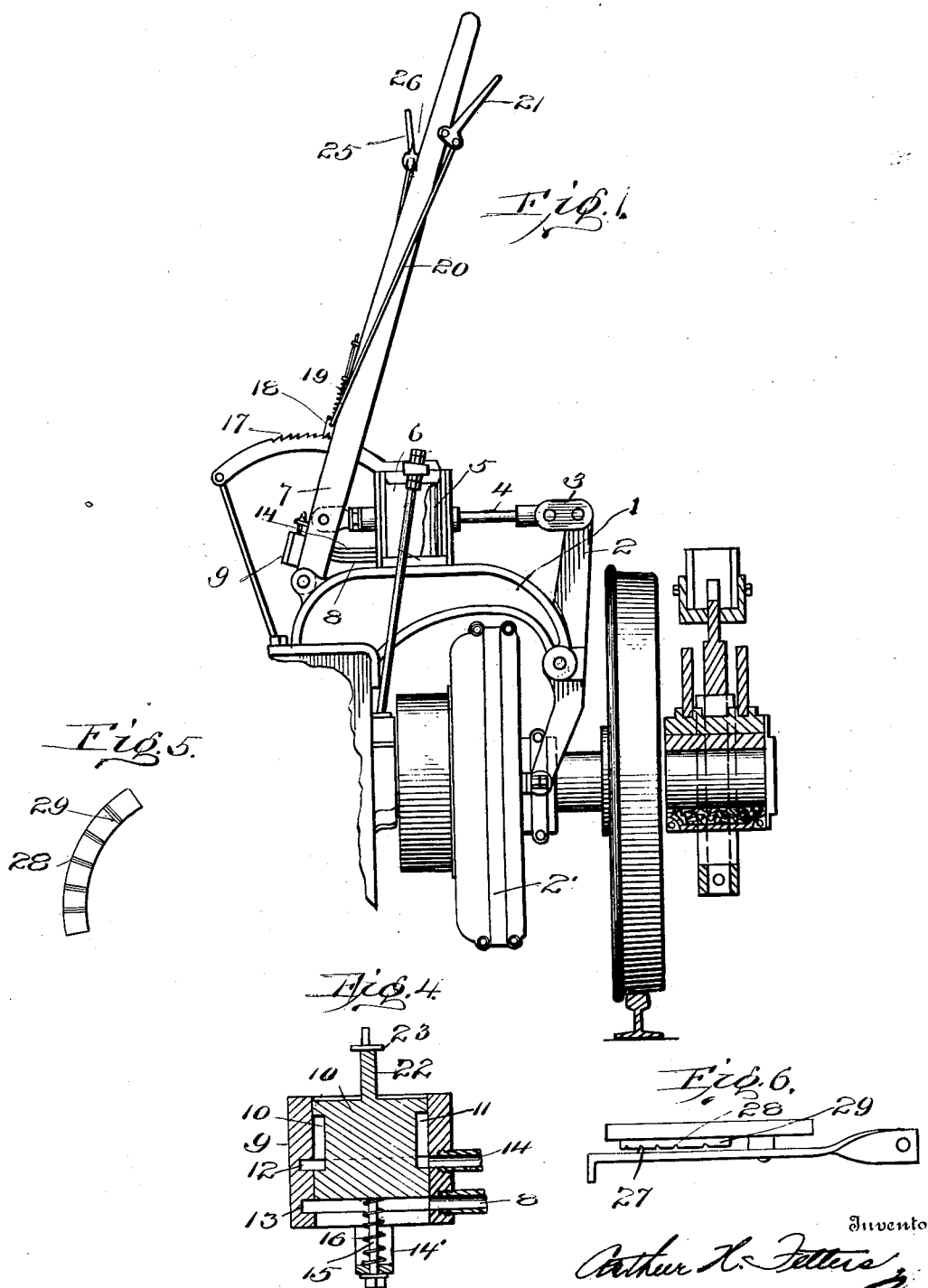

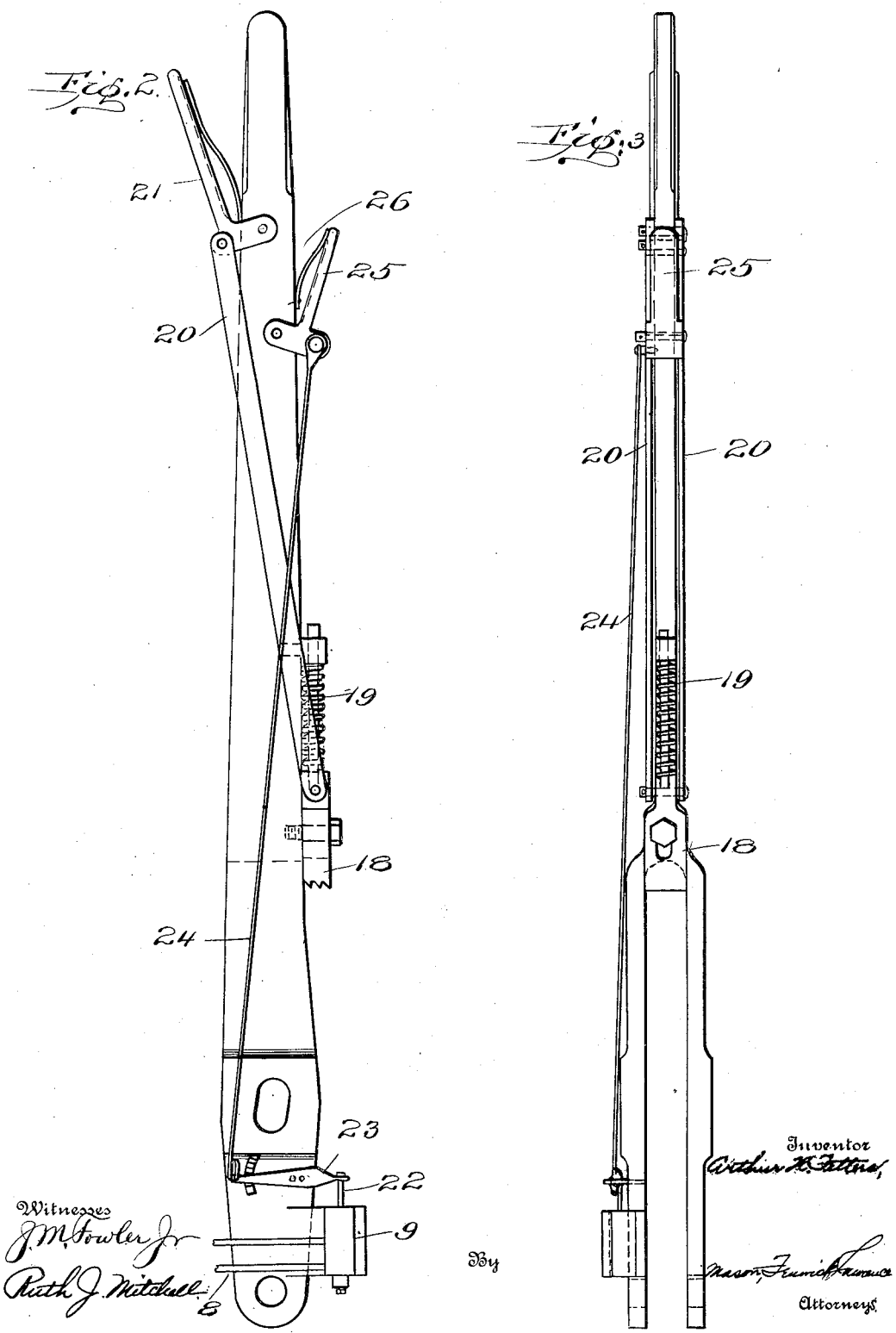

UNITED STATES PATENT OFFICE.

ARTHUR H. FETTERS, OF OMAHA, NEBRASKA.

CLUTCH-THROWING MECHANISM.

No. 844,273.　　　　Specification of Letters Patent.　　　　Patented Feb. 12, 1907.

Application filed May 17, 1905. Serial No. 260,827.

*To all whom it may concern:*

Be it known that I, ARTHUR H. FETTERS, a citizen of the United States, residing at Omaha, in the county of Douglas and State of Nebraska, have invented certain new and useful Improvements in Clutch-Throwing Mechanism; and I do hereby declare the following to be a full, clear, and exact description of the invention, such as will enable others skilled in the art to which it appertains to make and use the same.

This invention relates to actuating mechanism, and more particularly to clutch-throwing devices.
One of the objects thereof is to provide means for throwing a lever with facility against a comparatively great resistance.

Another object is to provide simple and efficient clutch-throwing means.
Another object is to provide means for throwing a clutch member with any desired degree of force.

Another object is to provide means in connection with those of the second-mentioned type which shall be under complete and convenient control at all times.

Other objects will be in part obvious and in part pointed out hereinafter.

The invention accordingly consists in the features of construction, combinations of elements, and arrangement of parts which will be exemplified in the apparatus hereinafter described and the scope of the application of which will be indicated in the following claims.

In the accompanying drawings, wherein is shown one of various possible embodiments of my invention, Figure 1 is a side elevation thereof. Fig. 2 is a similar view of a lever with associated parts. Fig. 3 is an end elevation of the parts shown in Fig. 2. Fig. 4 is a cross-section of a valve. Fig. 5 is a detail view of a spring. Fig. 6 is a plan of the spring shown in Fig. 5, showing its relation to the coacting parts.

Similar reference characters refer to similar parts throughout the several views of the drawings.

As tending to render better understood certain of the features of my invention, it may here be noted that I have found that in connection with a vehicle driven by power transmitted through a clutch it is highly desirable that the action of the clutch be at all times under complete and exact control, so as to enable the same to be thrown in with-
out injurious shock and jar to the machinery or the discomfort to the passengers resulting from an excessively sudden start. It may also be noted that I have found it desirable to provide means whereby the members of a clutch which is to transmit a considerable amount of power may be thrown into operative relation without the expenditure of any material amount of manual labor by the operator. The above and other advantageous features are attained in constructions of the nature of that hereinafter described.

Referring now to the drawings by numeral, 1 indicates any suitable bracket which is bifurcated at its free end and pivotally supports a lever 2, extending through such bifurcation. The lower end of lever 2 engages one of the members of a clutch 2' for throwing the clutch into operation when the lever is swung in one direction and for throwing the clutch out of operation when the lever is swung in the opposite direction. The clutch 2' may be of any preferred type as far as the present invention is concerned and has therefore not been shown in detail in the accompanying drawings. The upper end of the lever 2 is pivotally engaged by a link 3, which link in turn is engaged by a second link 4, constituting a piston-rod, carrying a piston 5, arranged within a cylinder 6. The link 4 extends beyond the cylinder 6 and is pivotally connected to a lever 7. A pressure supply and exhaust pipe 8 communicates with one end of the cylinder 6, and said pipe extends from said cylinder to the valve-casing 9 of the valve 10, carried by the lever 7. The valve 10 is slidingly mounted in the open-ended casing 9 and is provided with an annular groove 11, extending for a greater part of the length of the valve 10 and of sufficient width for permitting registration with the annular grooves 12 and 13 of the casing 9 simultaneously, whereby pressure may be admitted from the pressure-supply pipe 14, leading from any suitable source of pressure-supply (not illustrated) to the pipe 8. To normally prevent such supply, a strap or other suitable support 14' is fixed beneath the casing 9 and is slidingly penetrated by a stem 15, carried by the lower end of the valve 10, said valve being surrounded by a coil-spring 16, normally pressing the valve 10 upwardly for cutting off communication between the pipe 8 and the atmosphere.

The lever 7 is bifurcated, as seen in Fig. 3, and incloses the segment-rack 17, a pawl 18 being carried by the lever 7 in position for being pressed into engagement with the teeth of the rack 17 by a suitable spring 19, engaging said pawl. The usual link 20 extends from the pawl 18 to the gripping-lever 21, pivoted near the upper end of lever 7 and adapted to be pressed toward the lever 7 for elevating the pawl 18 out of engagement with the rack 17. The pawl 18 is of course beveled, as usual, so as to walk over the teeth of rack 17 in one direction and for locking against return.

The valve 10 is provided with an upwardly-projecting stem 22, above which is arranged the free end of a valve-actuating lever 23, said lever 23 being pivoted to the lever 7 and at its free end being engaged by a rod 24, extending upwardly to and pivotally engaging a gripping-lever 25, the gripping-lever 25 being pivoted to the lever 7 near its upper end. A suitable spring 26 is interposed between the lever 25 and lever 7 for retaining the same normally in position, with the rod 24 depressed and the free end of the lever 23 elevated out of operative engagement with the stem 22. As best seen in Fig. 6, the lever 23 is provided with a laterally-projecting spring-tooth 27, designed to engage any one of a series of notches 28, formed in the segmental plate 29, fixed to the lever 7.

As seen in Fig. 1, the lever 2 preferably engages a clutch-actuating mechanism, but as far as the present invention is concerned may actuate any device wherein the control is desired to be either manual or under pressure and where the amount of pressure employed is positively controlled. The clutch illustrated is of the friction type, and the varying degrees to which the movable element of the clutch may be thrown for increasing or decreasing the friction for causing more or less power to be transmitted is designed to be controlled by the above-described mechanism. If, for instance, the clutch member is to be thrown in to a very slight extent, the lever 7 may be actuated manually, and if the throwing of the clutch member is found to require too great an exertion it is only necessary to press the gripping-lever 25 for a distance for causing the lever 23 to swing upon its pivot until the tooth 27 comes into engagement with the first notch 28, which operation will cause the free end of the lever 23 to be sent an extent sufficient for causing the valve 10 to travel downwardly until the lower edge of the groove 11 begins to register with the groove 13, so that a relative small quantity of pressure is admitted through the pipe 8 to the cylinder 6, and the piston 5 is thrown under a slight pressure, which will accomplish the desired result of pressing the above-mentioned clutch member into operative engagement only to a slight extent. When further engagement of said clutch member is desired, it is only necessary to press the lever 25 upwardly another step, or to the extent necessary for causing the tooth 27 to engage the next notch 28, whereupon the valve 10 is depressed to an extent for further opening communication between the pipes 14 and 8, which are of flexible material, and allowing a greater amount of pressure to be admitted to the cylinder 6. When it is desired to throw the clutch member to its fullest extent, the lever 25 is pressed toward the lever 7 to its fullest extent, and the tooth 27 of lever 23 is caused to move into engagement with the uppermost notch 28, which movement insures the depression of the valve 10 to its limit, at which point the communication between the pipes 14 and 8 is completed and the entire pressure-supply to pipe 14 will be communicated to the cylinder 6. It is to be noted that when a small quantity of pressure is admitted to the cylinder 6 the lever 7 is moved for a short distance over the segments 17 and is locked at such point by the pawl 18, and after the lever 25 is released the spring 26, which is considerably stronger than the engagement-tooth 27, will throw the lever 25 back to its normal position, returning the lever 23 to its normal position and permitting the valve 10 to be moved upwardly under the action of spring 16, which operation permits of the discharge of pressure from the cylinder 6 through the open lower end of the casing 9. It is therefore apparent that the tooth 27 is not intended to lock the lever 23 at the various points of the several notches 28, but is only intended to indicate to the operator that the lever 23 has assumed one of the several steps of its various positions, and said tooth 27 is designed to readily move past the notches 28 in either direction when the lever 25 is actuated in one direction manually or in the other direction by the spring 26.

From the foregoing it will be observed that the movable member of the clutch may be thrown into engagement with the power member for transmitting movement at various speeds, according to the degree of tightness of contact of the parts of the clutch, or, in other words, according to the amount of slip permitted between parts of the clutch. The mechanism driven by the clutch may thus be given any speed desired from the minimum up to as high a speed as that at which the driving member of the clutch is rotated, the movable clutch member being held in any given position by the ratchet 18 and being readily movable to an inoperative position by operation of the lever 21 and the swinging of the lever 7 in a direction opposite its former movement when acted upon by pressure in the cylinder 6. The fact that the lower end of the valve-casing 9 is open and the pipe 8 communicates with such lower end permits the ready influx and discharge of air to and from the cylinder 6, which prevents vacuum therein and facilitates manual actuation of the lever 7. The head of the cylinder 6 opposite that entered by pipe 8 may be provided with any suitable perforations for permitting admission and discharge of air.

In order to avoid ambiguity in the meaning of the term "clutch" as used throughout this description and the following claims, it may here be noted that the same is employed in a broad sense as denoting any power-transmitting means adapted to be thrown into and out of inoperative condition. It will thus be seen that I have provided mechanism which on account of the few parts, simple construction, and positive action thereof is adapted to operate in a reliable and efficient manner under all conditions of use.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention which as a matter of language might be said to fall therebetween.

What I claim is—

1. In a mechanism of the class described, in combination, a clutch member, means for moving said member, a detent for preventing retraction of the clutch-member-moving means in its various positions, pressure-controlled means for actuating said clutch-member-moving means and manually-actuated means for operating said clutch-member-moving means.

2. In a mechanism of the class described, in combination, a clutch member, means for moving the same, a pressure-cylinder, means connected therewith for actuating the clutch-moving means, a normally open discharge for the cylinder, a spring-pressed valve adapted to be actuated for closing such discharge and supplying fluid under pressure to the cylinder, and means for governing said valve.

3. In a mechanism of the class described, in combination, a clutch member, means for moving the same, a pressure-cylinder, a piston connected therewith for operating said clutch-member-actuating means, the said cylinder having a normally open exhaust, a spring-pressed valve adapted to be actuated for closing said exhaust means for supplying pressure to said cylinder, and means for actuating the said valve.

4. In a mechanism of the class described, in combination, a clutch member, a cylinder, a piston therein connected with said clutch member, a manually-operated lever connected with said clutch member and adapted to actuate the same independently of said cylinder, a normally open spring-pressed valve controlling the exhaust from said cylinder, and means mounted adjacent said manually-actuated lever for controlling said valve.

5. In a mechanism of the class described, in combination, a clutch member, a piston for actuating the same, a cylinder inclosing said piston, means for supplying pressure to said cylinder, a lever controlling the supply of pressure, a manually-operated lever mounted adjacent the first-mentioned lever and connected with said clutch member for imparting movement thereto independently of the cylinder, and means connecting the two levers for transmitting movement from one to the other.

6. In mechanism of the class described, in combination, a clutch member, a cylinder, a piston within said cylinder connected with said clutch member, a manually-actuated lever connected with said clutch member adapted to actuate the same independently of said cylinder, and means mounted upon said lever controlling the pressure within said cylinder.

7. In mechanism of the class described, in combination, a movable member, a manually-actuated lever connected therewith and adapted to move the same, a source of power, means connecting said source of power with said movable member, and means mounted upon said lever connected with and adapted to control said source of power.

8. In mechanism of the class described, in combination, a clutch member, a cylinder, a piston within said cylinder connected with said clutch member, means adapted to supply a compressed fluid to said cylinder, a manually-actuated lever adapted to actuate said clutch member independently of said cylinder, a valve controlling the admission and exhaust of said cylinder, and means mounted upon said lever controlling said valve.

9. In mechanism of the class described, in combination, a clutch member, a cylinder, a piston within said cylinder, a connection between said piston and said clutch member, a manually-actuated lever connected with said clutch member, means adapted normally to maintain communication between said cylinder and the atmosphere, and manually-actuated means adapted to cut off said communication and lead a compressed fluid within said cylinder, said manually-actuated means being mounted upon said lever.

10. In mechanism of the class described, in combination, a clutch comprising fixed and movable members, a lever connected with said movable member, a cylinder, a piston within said cylinder, a rod extending from said piston, a manually-actuated lever, connections between each of said levers and said piston-rod, a valve controlling the pressure within said cylinder, and manually-controlled means controlling said valve.

11. In mechanism of the class described, in combination, a clutch comprising fixed and movable members, a lever connected with said movable member, a cylinder, a piston within said cylinder, a rod extending from said piston, a manually-actuated lever, connections between each of said levers and said piston-rod, a valve controlling the pressure within said cylinder, and manually-controlled means controlling said valve, said manually-controlled means being mounted upon said second lever.

12. In mechanism of the class described, in combination, a clutch comprising fixed and movable members, a lever connected with said movable member, a cylinder, a piston within said cylinder, a rod extending from said piston, a manually-actuated lever, connections between each of said levers and said piston-rod, a valve controlling the pressure within said cylinder, manually-controlled means controlling said valve, said manually-controlled means being mounted upon said second lever, and means adapted to restrict the movement of said second lever in one direction.

13. In mechanism of the class described, in combination, a clutch comprising fixed and movable members, a lever connected with said movable member, a cylinder, a piston within said cylinder, a rod extending from said piston, a manually actuated lever, connections between each of said levers and said piston-rod, a valve controlling the pressure within said cylinder, manually-controlled means restricting said second lever, and a pivoted member adjacent to the free end of said second lever connected with and adapted to control said valve.

In testimony whereof I affix my signature in presence of two witnesses.

ARTHUR H. FETTERS.

Witnesses:
EDGAR M. KITCHIN,
CHARLES L. DUNDEY.